(12) United States Patent
Tarquini et al.

(10) Patent No.: US 8,083,266 B2
(45) Date of Patent: Dec. 27, 2011

(54) GAS RISER APPARATUS, AND METHOD FOR MAKING AND USING SAME

(75) Inventors: Joseph A. Tarquini, Rockford, IL (US); Kevin J. Belousek, Village of Lakewood, IL (US)

(73) Assignee: Chicago Fittings Corporation, Belvidere, IL (US)

( * ) Notice: Subject to any disclaimer, the term of this patent is extended or adjusted under 35 U.S.C. 154(b) by 0 days.

(21) Appl. No.: 12/705,927

(22) Filed: Feb. 15, 2010

(65) Prior Publication Data

US 2010/0140927 A1 Jun. 10, 2010

Related U.S. Application Data

(62) Division of application No. 11/455,410, filed on Jun. 19, 2006, now Pat. No. 7,661,722.

(60) Provisional application No. 60/692,189, filed on Jun. 20, 2005.

(51) Int. Cl.
*F16L 33/00* (2006.01)

(52) U.S. Cl. .......... 285/249; 285/96; 285/247; 285/272; 285/332.2

(58) Field of Classification Search .......... 285/98, 285/114–115, 332.1–332.2, 123.2, 123.12–123.13, 285/247–249, 256, 354, 382, 386, 272
See application file for complete search history.

(56) References Cited

U.S. PATENT DOCUMENTS

| | | |
|---|---|---|
| 244,446 A | 7/1881 | Gilmore |
| 2,417,350 A | 3/1947 | Conroy |
| 2,926,029 A | 2/1960 | St. Clair et al. |
| 3,539,207 A | 11/1970 | Harris |
| 3,877,734 A | 4/1975 | Brozek |
| 4,042,262 A | 8/1977 | Mooney et al. |
| 4,085,950 A | 4/1978 | Alewitz |
| 4,284,297 A | 8/1981 | Godkin |
| 4,343,498 A | 8/1982 | Campanini |
| 4,482,170 A | 11/1984 | Jacobson et al. |
| 4,669,757 A | 6/1987 | Bartholomew |
| 4,687,235 A | 8/1987 | Stoll |
| 4,801,159 A | 1/1989 | Sehorn |
| 5,105,854 A | 4/1992 | Cole et al. |
| 5,326,137 A | 7/1994 | Lorenz et al. |
| 5,383,492 A | 1/1995 | Segal |
| 5,478,122 A | 12/1995 | Seabra |
| 5,653,480 A | 8/1997 | Mine et al. |
| 6,237,963 B1 | 5/2001 | Hall |
| 6,896,297 B2 | 5/2005 | Hall |
| 2003/0214133 A1 | 11/2003 | Robison et al. |

FOREIGN PATENT DOCUMENTS

WO    WO 99/56050    11/1999

*Primary Examiner* — Aaron Dunwoody
*Assistant Examiner* — Fannie Kee
(74) *Attorney, Agent, or Firm* — Reinhart Boerner Van Deuren P.C.

(57) ABSTRACT

A gas riser apparatus, and methods for making and using a gas riser apparatus, utilize a swivel-nut having an annular collar section thereof which includes a radially outwardly opening annular groove therein adapted for swaged/crimped attachment to the remainder of the riser, at an above-ground end of the riser. For risers including a rigid metallic pipe section, the above-ground end of the pipe may be configured for swaged/crimped attachment to the annular collar of the swivel-nut through application of radially inwardly directed pressure on the above-ground end of the rigid riser pipe. For risers not having a rigid metallic section, a swage/crimp collar may be utilized for forming a connection between a flexible metal conduit and the swivel-nut, through application of radially inwardly directed pressure applied to the swage/crimp collar while the collar is disposed about the above-ground end of the flexible metal conduit.

15 Claims, 11 Drawing Sheets

GAS RISER APPARATUS, AND METHOD FOR MAKING AND USING SAME

CROSS-REFERENCE TO RELATED PATENT APPLICATIONS

This patent application is a divisional of co-pending U.S. patent application Ser. No. 11/455,410, filed Jun. 19, 2006. This patent application claims the benefit of U.S. Provisional Patent Application No. 60/692,189, filed Jun. 20, 2005, the entire teachings and disclosures of which are incorporated herein by reference thereto.

FIELD OF THE INVENTION

This invention relates to gas risers for connecting underground gas service lines, and particularly plastic service lines, with above-ground meters and the like.

BACKGROUND OF THE INVENTION

Flammable gases, such as natural gas and propane, are typically routed through underground supply lines between buildings and a source of gas, such as a gas main or storage tank, for safety purposes. For several decades, thermoplastic tubing has been the preferred method of making such underground connections, because such plastic tubing eliminates problems with corrosion encountered with the use of metal underground gas piping, in previous times.

Where the plastic gas supply tubing emerges from the ground, for connection to gas meters and regulators, and the like, common sense and government regulations require that a protective sheath, known in the industry as a gas riser, be installed around the plastic gas supply tube, from the point of the above-ground connection, to an underground point on the tube spaced several feet from the above-ground point of connection. The gas riser, therefore, protects the plastic tube from being damaged by contact above-ground with lawnmowers, grass trimmers, and the like, and also provides protection extending along the length of the riser underground.

Although the particular configuration of a given gas riser will be determined by applicable government regulations, and preferences of a particular gas supplier, such risers are generally required to be L-shaped, with a lower leg of the L extending substantially horizontally underground for receiving the plastic tube from the source of the gas, and the second leg extending substantially vertically out of the ground for connection to a gas regulator, meter, or other piping attached to the building being supplied with gas.

In some gas riser installations, regulations and customer preferences dictate that at least a portion of the vertically extending leg of the riser be formed from a rigid section of metal pipe. The remainder of such risers is sometimes provided by a flexible metallic conduit attached to the lower end of the rigid section. In other gas riser applications, the rigid pipe section is eliminated, and the entire riser is formed from a flexible metal conduit material.

The underground end of such gas risers typically includes an environmental seal, having a hole through which the gas supply tubing may pass. The above-ground end of the riser typically includes a threaded fitting, for connecting the riser to a gas meter, regulator, or building piping, in such a manner that the plastic tubing is not exposed.

The L-shape of the installed gas riser makes it difficult to complete the threaded connection to a gas meter, or the like. The entire length of the riser must be rotated about the gas supply tube in order to complete the connection.

In order to facilitate making the above-ground threaded connection of the gas riser to a meter, or the like, various types of swivel fittings have been employed, in the past. In some instances, the swivel fittings are screwed onto, or into, the end of the riser. In other prior approaches, various types of swiveling fittings have been attached directly to the upper end of the riser, by methods which are undesirably complex and cumbersome.

It is desirable, therefore, to provide an improved gas riser. It is particularly desirable to provide an improved gas riser having an integral swivel at the above-ground end thereof, and methods for making and using such an improved riser.

BRIEF SUMMARY OF THE INVENTION

The invention provides an improved gas riser apparatus, and methods for making and using such an improved gas riser apparatus, through use of a swivel-nut having an annular collar section thereof which includes a radially outwardly opening annular groove therein adapted for swaged/crimped attachment to the remainder of the riser, at an above-ground end of the riser. For risers including a rigid metallic pipe section, the above-ground end of the pipe may be configured for swaged/crimped attachment to the annular collar of the swivel-nut through application of radially inward directed pressure on the above-ground end of the rigid riser pipe. For risers not having a rigid metallic section, a swage/crimp collar may be utilized for forming a connection between a flexible metallic conduit, and the swivel-nut, through application of radially inwardly directed pressure applied to the swage/crimp collar, while the collar is disposed about the above-ground end of the flexible metal conduit.

An apparatus, according to the invention, may further include a nipple fitting, having one end thereof threaded for connection to a meter or the like, and an opposite end configured to form a hose bib connection, over which the above-ground end of the gas supply line may be inserted. The opposite end of the nipple further includes a threaded portion thereof, disposed about the hose bib and configured for threadably engaging with the distal end of the swivel-nut, to thereby secure the swivel-nut to the nipple.

A swivel-nut, according to the invention, may further define an internal cavity thereof, adapted for receiving a rubber seal for applying a compressive force to the outer surface of the gas supply line as the swivel-nut is tightened onto the second end of the nipple. An apparatus, according to the invention, may include the rubber seal. An apparatus, according to the invention, may also include a metallic ferrule, disposed within a bore in the rubber seal, and having surfaces thereof configured for biting into the outer surface of the gas supply line and the rubber seal, as the swivel-nut is tightened on the nipple, to thereby further secure the above-ground end of the gas supply line on the hose bib of the nipple.

In forms of the invention having a rigid metallic section of the riser, a flexible metallic hose section of the riser may be attached at the lower end of the rigid section by a swaged/crimped joint. The lower end of the rigid section may include a counterbored portion thereof, for receiving an end of the flexible metallic portion therein. The lower end of the rigid section may be swaged/crimped only in the region of the counterbore, through application of radially inwardly directed pressure.

An apparatus, according to the invention, may include only a swivel-nut, in accordance with the invention. Alternatively, the invention may take the form of a swivel-nut, according to the invention, in combination with other components for attaching the swivel-nut to the remainder of a gas riser, or connecting the completed gas riser to a meter and the like. The invention may alternatively take the form of a complete gas riser, in accordance with the invention.

The invention may also take the form of a method for manufacturing, and/or utilizing a apparatus according to the invention.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
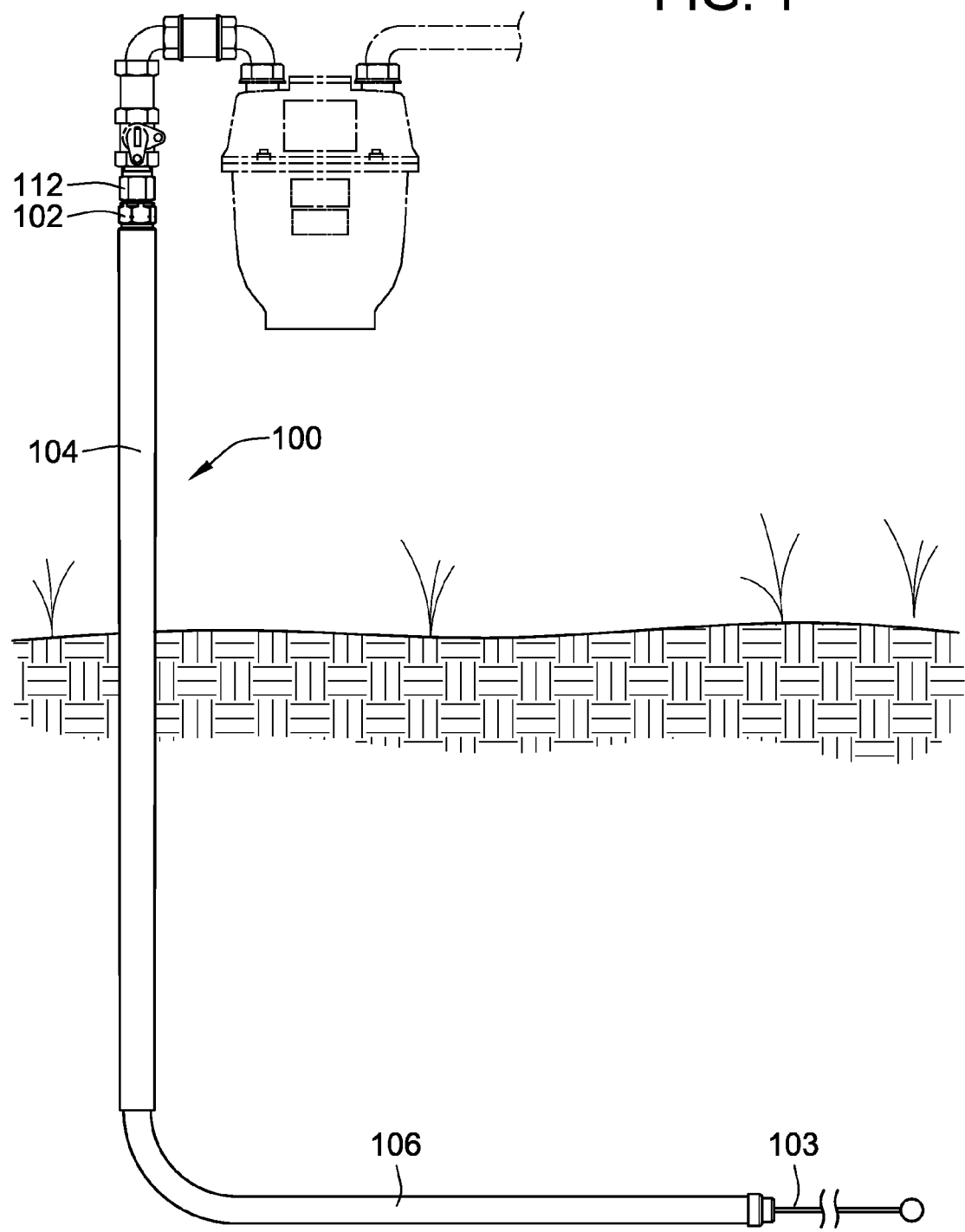
FIGS. 1-6 show a first exemplary embodiment of a gas riser, according to the invention, in which the gas riser includes a rigid metallic conduit section adjacent the above-ground end of the riser, and the manner in which the first exemplary embodiment is manufactured and installed.
Figure 2:
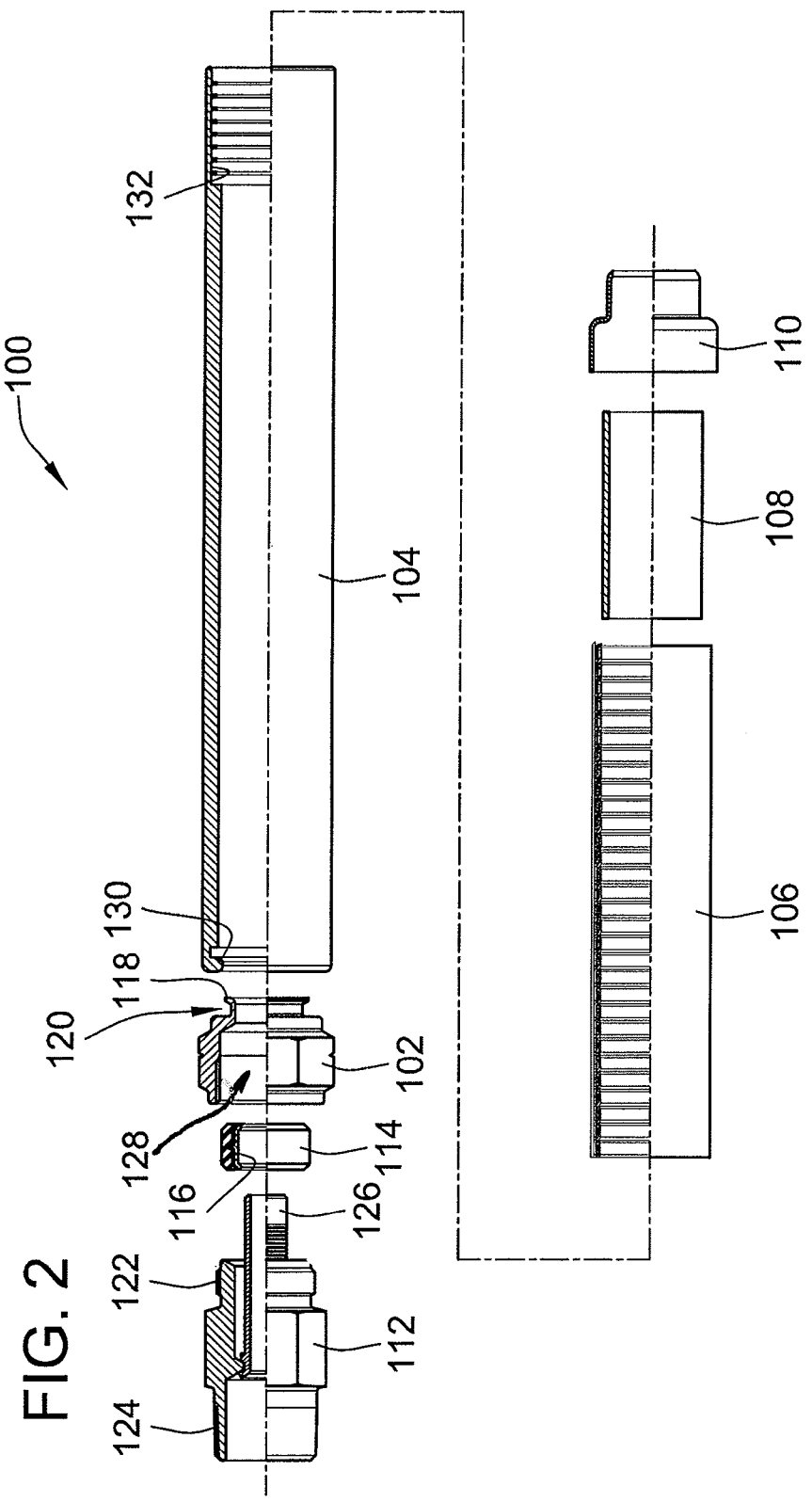
Figure 3:
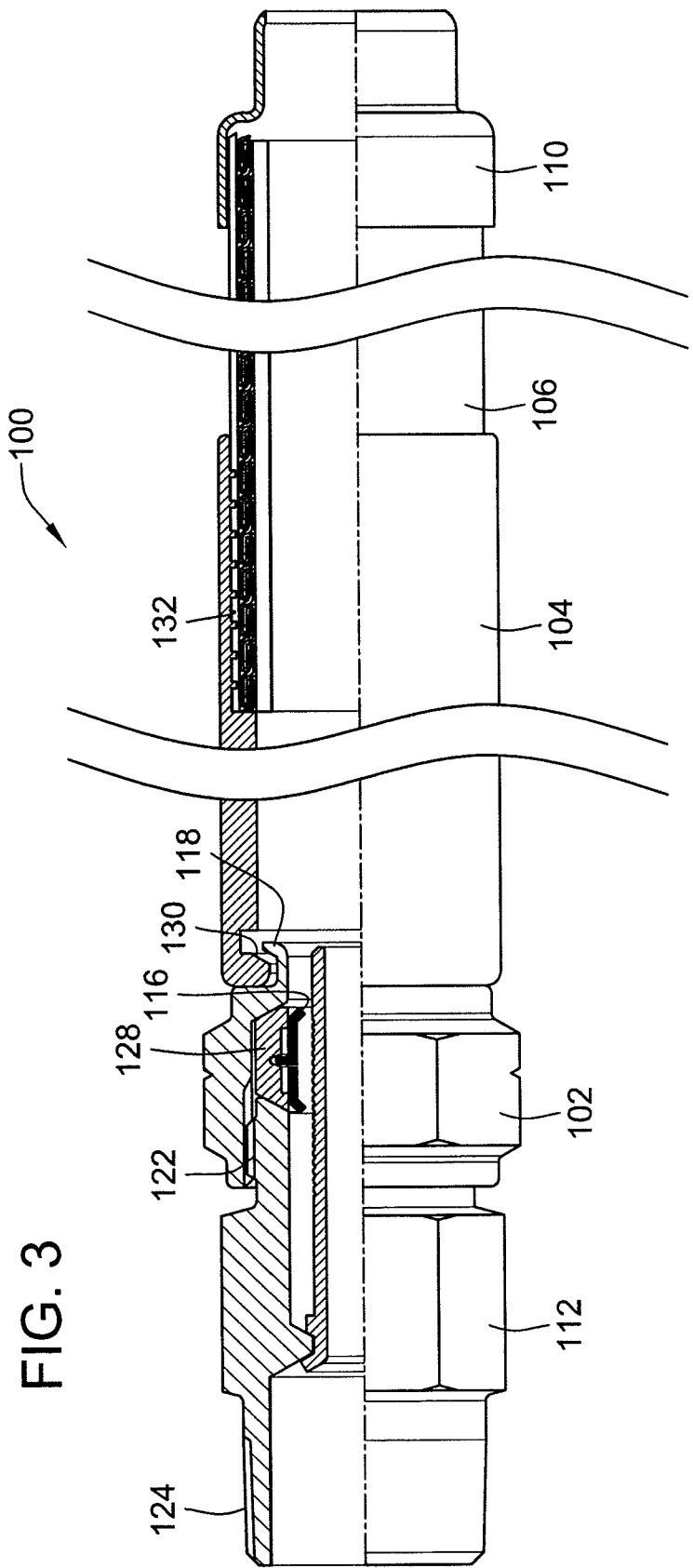
Figure 4:
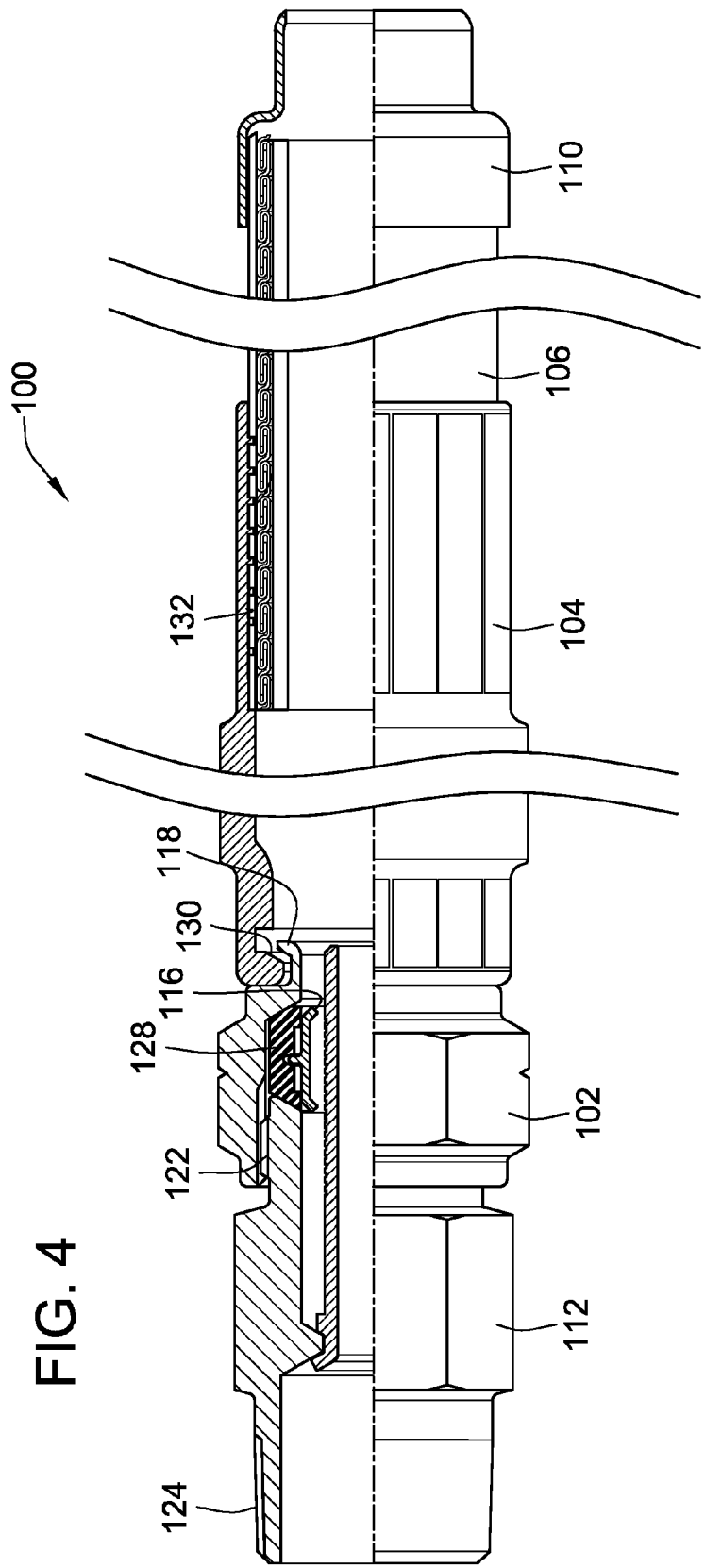

FIGS. 1-3 show a first exemplary embodiment of a gas riser apparatus 100, according to the invention. FIG. 1 shows the various components of the first exemplary embodiment of the gas riser 100 in exploded form. FIG. 2 shows the components of the first exemplary embodiment of the gas riser 100 in a pre-assembled form, prior to application of pressure for forming swaged joints of the riser 100. FIG. 4 shows the first exemplary embodiment of the gas riser 100, in a completed form.

As best seen in FIG. 2, the first exemplary embodiment of the gas riser includes a swivel-nut 102, a rigid conduit section 104, a flexible conduit section 106, a plastic liner 108, a moisture seal 110, a nipple 112, a rubber seal 114, and a ferrule 116. It should be noted, that the rigid and flexible conduit sections 104, 106, and the plastic liner 108 are shown in a foreshortened form, in FIGS. 2-4, for purposes of illustration. In practice, it is contemplated that the rigid section of conduit 104 might have an approximate length of 4 feet, and that the flexible conduit section might also have a length of 4 feet, for example, with the plastic liner having a length sufficient to extend completely through the flexible and rigid sections of the gas riser 100. In use, the left end, as illustrated, of the gas riser 100 which includes the swivel-nut 102, forms an above-ground end of the gas riser 100, and the opposite end of the gas riser 100, terminating in the moisture seal 110 forms a below-ground end of the gas riser 100, as illustrated in FIG. 1.

Figure 5:
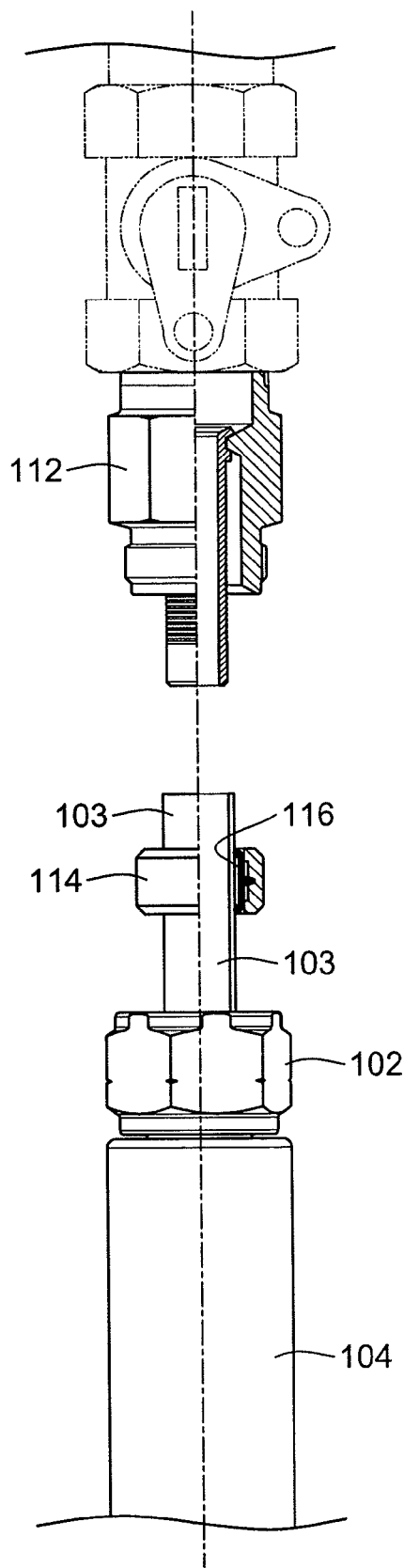

The swivel-nut 102 includes a hollow body defining a center line of the nut 102, and first and second ends of the swivel-nut 102. The swivel-nut further includes an annular collar 118 extending axially away from the first end of the body of the swivel-nut 102 about the center line, and having an outwardly opening annular groove 120 therein. The second end of the swivel-nut 102 is threaded, to engage corresponding threads 122 on one end of the nipple 112, for securing the swivel-nut 102 to the nipple 112. The opposite end of the nipple 112 includes threads 124 for attachment of the gas riser 100 to a meter, or the like, attached to a building to be connected to a source of gas by a plastic gas supply tube 103 (as shown in FIGS. 1 and 5) extending through the hollow interior or the gas riser 100. The first end of the nipple 112 further includes a hose bib 126 extending axially therefrom, over which the above-ground end of the plastic gas supply tube 103 can be pushed.

Figure 6:
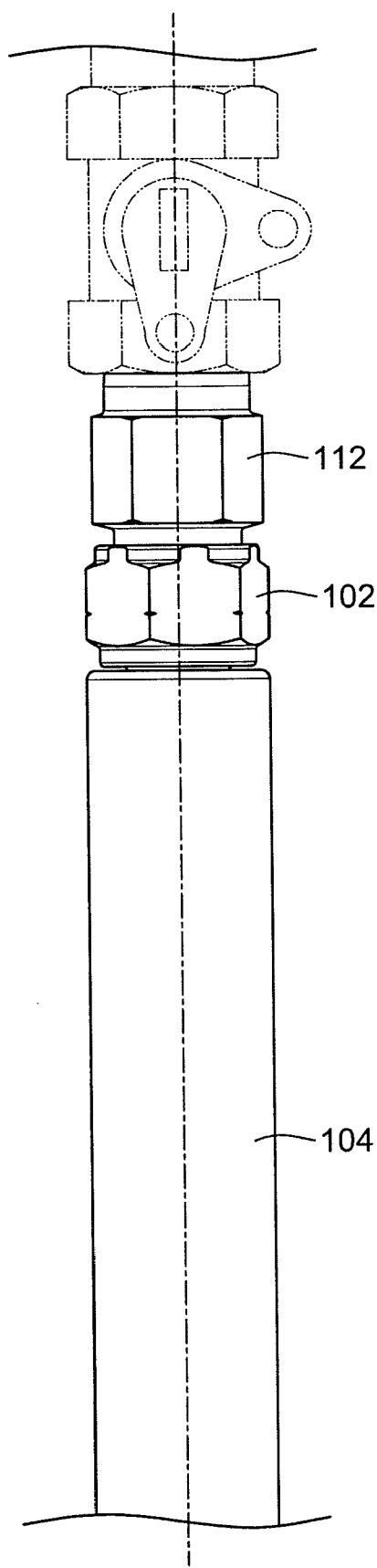
Figure 7:
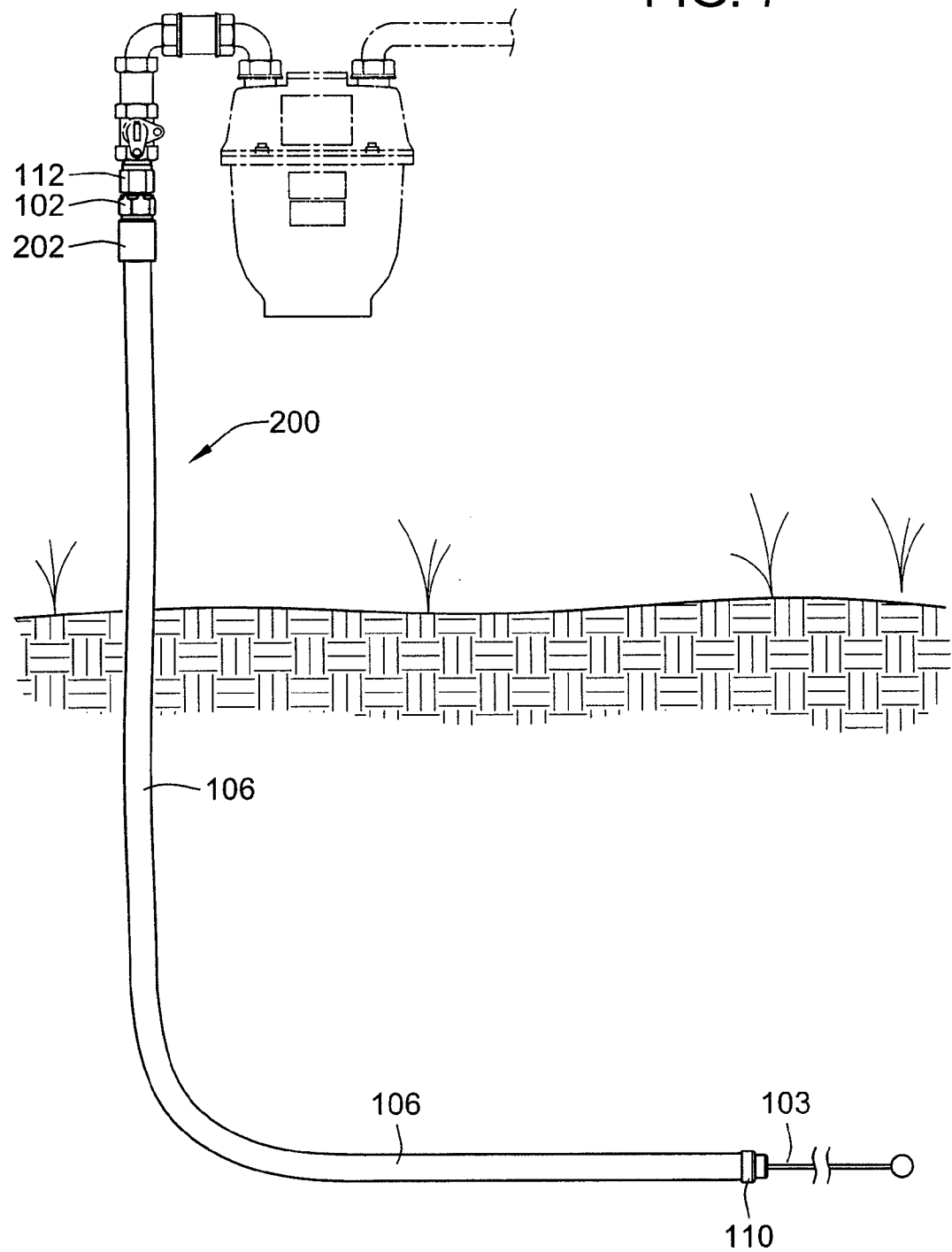
FIGS. 7-10 show a second exemplary embodiment of a gas riser, according to the invention, which does not include a rigid metallic section adjacent the above-ground end of the riser, and the manner in which the second exemplary embodiment is manufactured and installed.

The swivel-nut 102 further defines an internal cavity 128, for receiving the rubber seal 114 and the ferrule 116. Specifically, as illustrated in FIG. 5, the nipple 112 is first threadably attached to the gas meter apparatus, with the hose bib 126 extending outward from the installed nipple 112. The ferrule 116 and rubber seal 114 are then slid into place over the above-ground end of the gas supply tube 103, prior to the above-ground end of the supply tube being slipped over the hose bib 126. The above ground end of the gas supply pipe 103 is then slid over the hose bib 126, and the swivel-nut 102 is threaded onto the nipple 112. As the swivel-nut 102 is threaded into place and tightened onto the nipple 112, the configuration of the cavity 128 in the swivel-nut 102 causes compression of the rubber seal 114 and ferrule 116 onto the end of the supply tube 103, to thereby secure the supply tube in place on the hose bib 126, and provide a fluid-type connection between the above-ground end of the supply tube and the hose bib 126, as shown in FIG. 6.

As shown in FIGS. 2-4, the end of the rigid conduit 104 adjacent the swivel-nut 102 includes a radially inwardly projecting annular ring 130, which is configured to engage the annular groove 120 in the swivel-nut 102, to thereby form a swiveled joint between the swivel-nut 102 and the rigid section 104, when the end of the rigid section 104 is swaged/crimped onto the swivel-nut 102 through application of radially inwardly directed pressure to an outer surface of the rigid conduit section, at a point opposite the annular ring 130.

The end of the rigid conduit section 104 opposite the annular ring 130 includes a counterbore 132 configured for receiving an end of the flexible conduit section 106. As shown in FIG. 3, in the exemplary embodiment of the gas riser 100, the rigid conduit section 104 and flexible conduit section 106 are joined together by applying radially inward directed pressure to the outer surface of the rigid conduit section 104, at a point opposite the counterbore 132.

FIGS. 7-10 illustrate a second exemplary embodiment of a gas riser 200, according to the invention. The second exemplary embodiment of the invention is essentially identical to the first embodiment, with the exception that the second exemplary embodiment of the gas riser 200 does not include the rigid conduit section 104 of the first exemplary embodiment of a gas riser 100.

In the second exemplary embodiment of the gas riser 200, a swage/crimp collar 202 is utilized for forming the swaged/crimped connection with the swivel-nut 102 and the above-ground end of the flexible conduit section 106. Specifically, the swage/crimp collar 202 includes a radially inward projecting annular ring 204, configured for receipt within the annular groove 120 of the swivel-nut 102, when swaged/crimped into position by radially inward directed forces applied to an outer surface of the collar 202.

The collar 202 is further configured for insertion therein of the above-ground end of the flexible conduit section 106, so that the collar 202 can be integrally joined to the flexible conduit section 106 by applying radially inward directed force to the outer surface of the collar 202 opposite the end of the flexible conduit 106 which is inserted into the collar 202.

Figure 8:
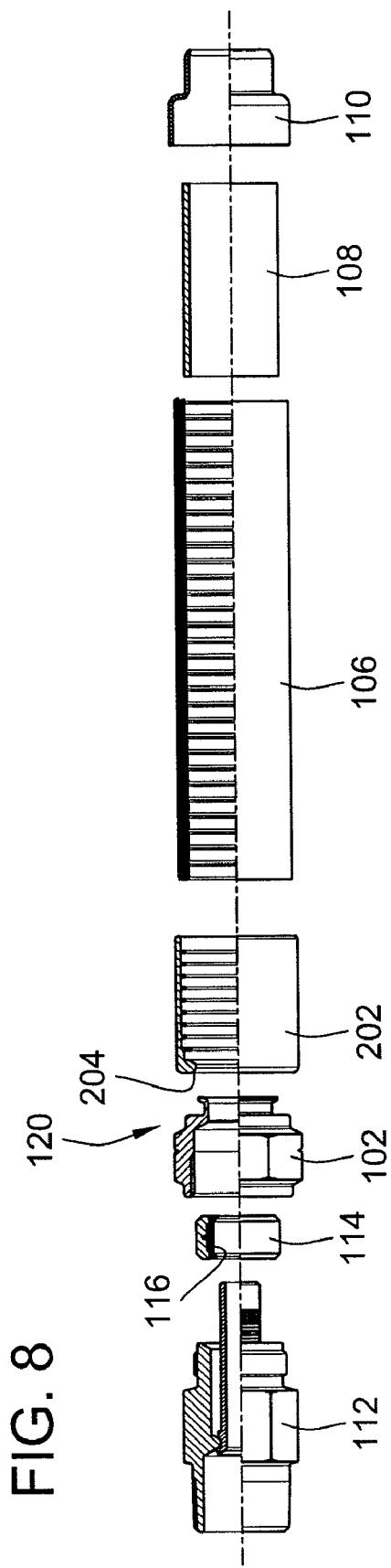
Figure 9:
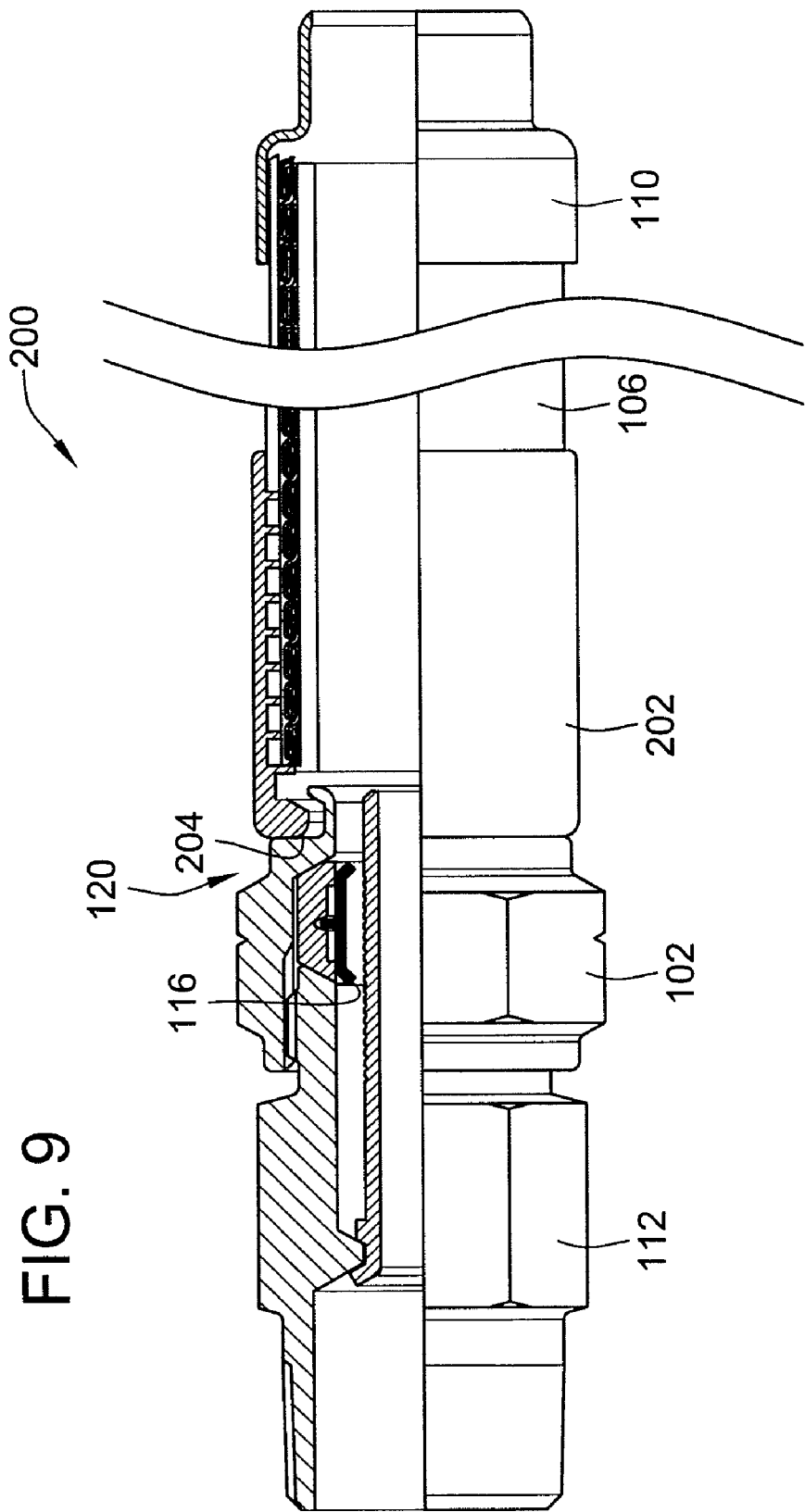
Figure 10:
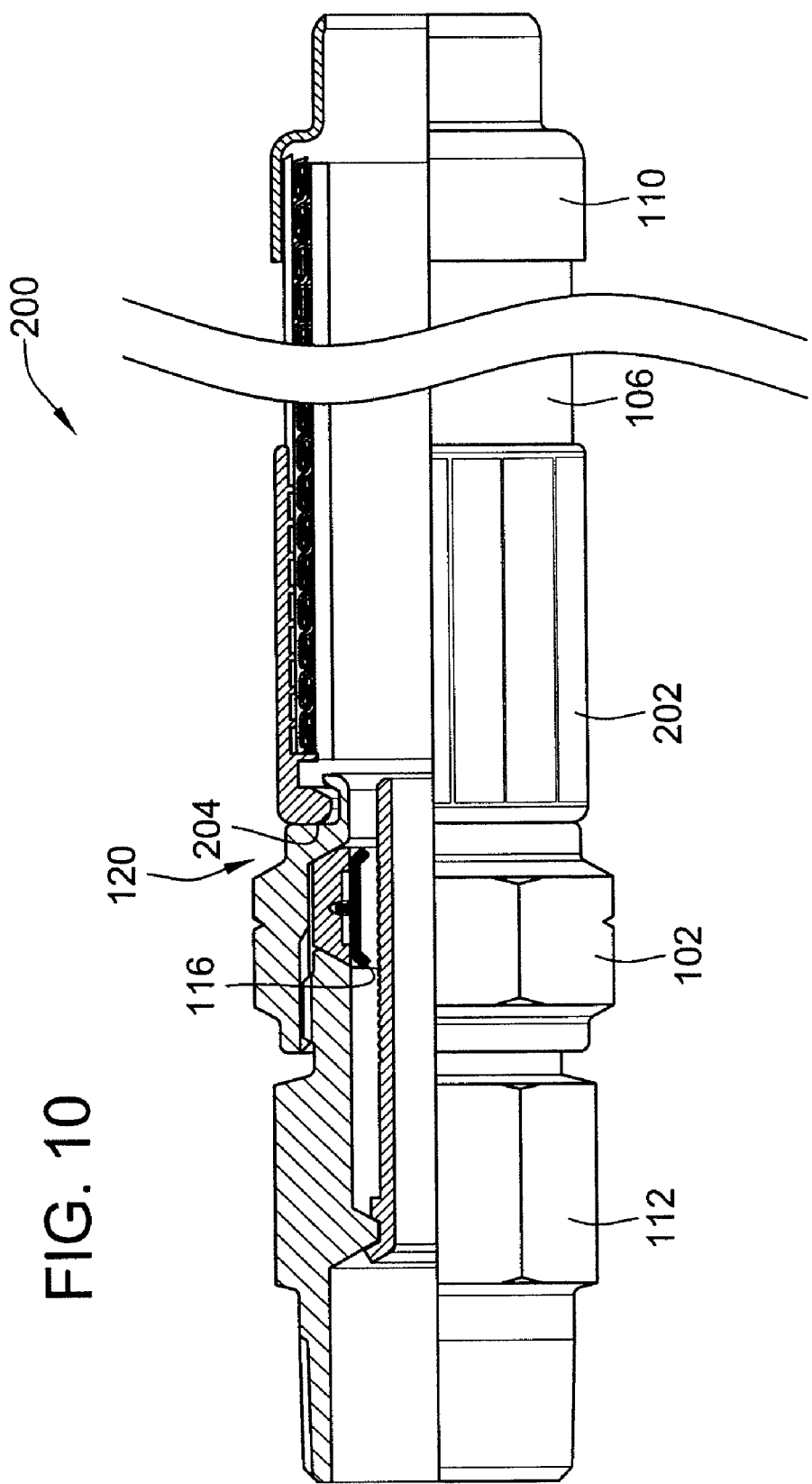

As was the case in the first exemplary embodiment 100, the flexible conduit section 106 of the second embodiment of the gas riser 200 is shown in a foreshortened form in FIGS. 8-10. It is contemplated that, in practice, the flexible conduit section 106 would have a length suitable for meeting the customers needs in the range of 3 to 8 feet, for example.

Installation of the second exemplary embodiment of the gas riser 200 is substantially identical to the installation of the first exemplary embodiment of the gas riser 100, as described hereinabove with regards to FIGS. 5 and 6.

Figure 11:
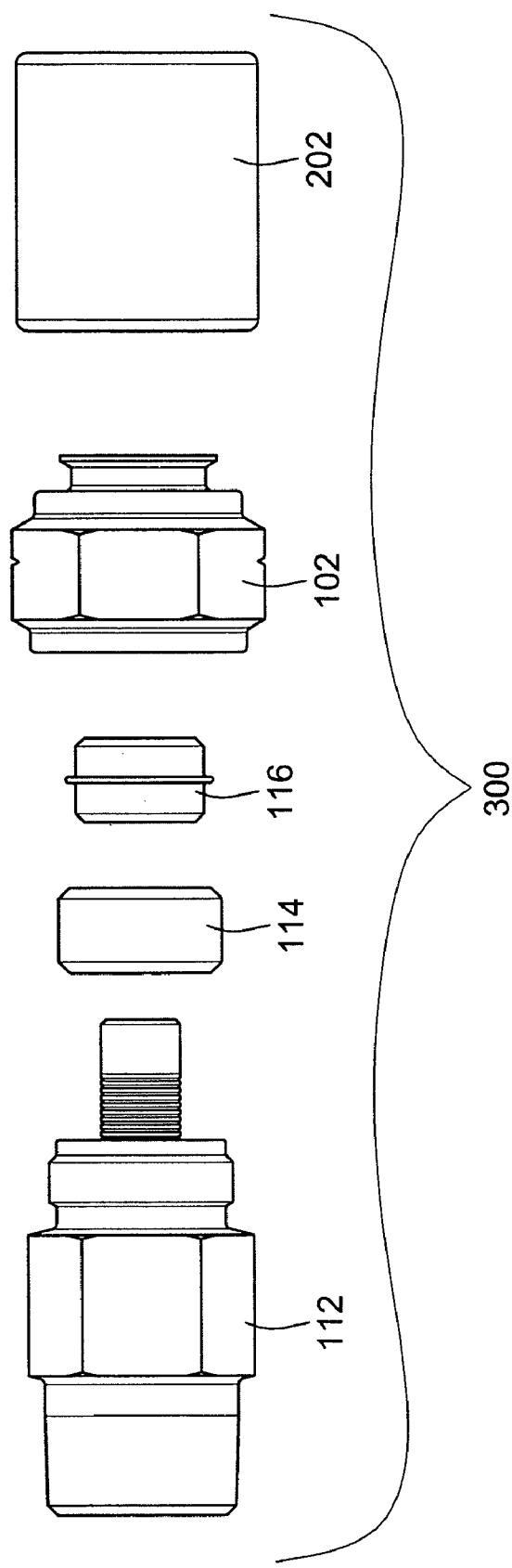
FIG. 11 shows a third exemplary embodiment of a gas riser fitting apparatus, according to the invention.

FIG. 11 illustrates a third exemplary embodiment of the invention, in the form of a gas riser fitting apparatus 300. The exemplary embodiment of the gas riser fitting apparatus 300 includes one or more of the following five (5) components, according to the invention, and described hereinabove: (1) a swivel-nut 102; (2) a nipple fitting 112; (3) a rubber seal 114; (4) a metallic ferrule 116; and/or (5) a swage/crimp collar 202.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gas riser apparatus, comprising:
   a swivel-nut, a nipple fitting, a rigid conduit, a flexible conduit section, and a rubber seal having a bore therein;
   the nipple fitting having one end thereof threaded for operative connection to a meter and an opposite end forming a hose bib connection, over which an end of a gas supply line may be inserted;
   the opposite end of the nipple fitting also having a threaded portion thereof, disposed about the hose bib and threadably engaging with the swivel-nut, to thereby secure the swivel-nut to the nipple fitting;
   the swivel-nut having a hollow body defining a centerline of the nut and first and second ends of the swivel-nut;
   the swivel-nut also having an annular collar extending axially from the first end of the body about the centerline, and having an outwardly opening groove therein;
   the second end of the swivel-nut having a threaded portion thereof for receiving the mating threaded portion of the opposite end of the nipple fitting;
   the swivel nut further defining an internal cavity thereof for receiving the rubber seal for applying a compressive force to an outer surface of the gas supply line as the swivel-nut is tightened onto the opposite end of the nipple fitting;
   the rigid conduit having a first end thereof attached to the flexible conduit section, and a second end thereof attached to the swivel-nut by a swaged/crimped joint in a manner allowing the swivel-nut to rotate with respect to the rigid conduit;
   the flexible conduit section being attached to the first end of the rigid conduit by a swaged/crimped joint, the first end of the rigid conduit including a counterbore for receiving an end of the flexible conduit section, and the swaged/crimped joint being formed by applying radially inward directed pressure to the outer surface of the rigid conduit opposite the counterbore at a magnitude sufficient to permanently deform the first end of the rigid conduit inward to clamp the end of the flexible conduit section within the counterbore;
   the second end of the rigid conduit having an annular end portion thereof, including a radially inwardly projecting annular ring adapted for operative receipt within the outwardly opening groove in the annular collar of the swivel-nut, when the end portion of the rigid conduit is swaged/crimped onto the swivel-nut by radially inward directed pressure applied to an outer surface of the rigid conduit opposite the annular ring, in such a manner that the swivel nut is freely rotatable about the centerline with respect to the rigid conduit but is substantially precluded from axial movement along the centerline with respect to the rigid conduit.

2. The gas riser apparatus of claim 1, wherein, the apparatus further comprises a metallic ferrule, disposed within the bore in the rubber seal, and having surfaces thereof configured for biting into the outer surface of the gas supply line and the rubber seal, as the swivel-nut is tightened on the nipple, to thereby clamp the above-ground end of the gas supply line onto the hose bib of the nipple.

3. The gas riser apparatus of claim 2, wherein:
   the metallic ferrule includes a substantially annular outward extending flange thereupon; and
   the bore in the rubber seal includes a substantially annular inwardly opening groove therein for receipt of the flange of the metallic ferrule.

4. The gas riser of claim 1, further comprising a plastic liner being disposed within the flexible conduit section.

5. A gas riser apparatus, comprising:
   a swivel-nut, a nipple fitting, a swage/crimp collar, a flexible conduit section, and a rubber seal having a bore therein;
   the nipple fitting having one end thereof threaded for operative connection to a meter and an opposite end forming a hose bib connection, over which an end of a gas supply line may be inserted;

the opposite end of the nipple fitting also having a threaded portion thereof, disposed about the hose bib and threadably engaging with the swivel-nut, to thereby secure the swivel-nut to the nipple fitting;

the swivel-nut having a hollow body defining a centerline of the nut and first and second ends of the swivel-nut;

the swivel-nut further including an annular collar extending axially from the first end of the body about the centerline, and having an outwardly opening groove therein;

the second end of the swivel-nut having a threaded portion thereof for receiving the mating threaded portion of the opposite end of the nipple fitting;

the swivel-nut further defining an internal cavity thereof for receiving the rubber seal for applying a compressive force to an outer surface of the gas supply line as the swivel-nut is tightened into the opposite end of the nipple fitting;

the swage/crimp collar having an annular end portion thereof, including a radially inward projecting annular ring adapted for receipt within the outwardly opening groove in the annular collar of the swivel-nut, when the annular end portion of the swage/crimp collar is swaged/crimped onto the swivel-nut by radially inward directed pressure applied to an outer surface of the collar opposite the annular ring at a magnitude sufficient to permanently deform and interlock the radially inward projecting annular ring of the swage/crimp collar into the outwardly opening groove in the annular collar of the swivel-nut in such a manner that the swivel-nut can rotate freely with respect to the swage/crimp collar about the centerline of the swivel-nut but the swage/crimp collar and swivel-nut cannot be separated from one another;

the swage/crimp collar also having a counterbore in an end of the swage/crimp collar opposite the annular end portion;

the flexible conduit section being inserted into the counterbore in the end of the collar opposite the annular end portion of the swage/crimp collar and joined to the swage/crimp collar through a swaged/crimped joint formed by radially inward directed pressure applied to an outer surface of the collar opposite the flexible conduit section in the counterbore at a magnitude sufficient to permanently deform and lock the swage/crimp collar onto the flexible conduit section.

6. The gas riser of claim 5, further comprising a plastic liner being disposed within the flexible conduit section.

7. The gas riser apparatus of claim 5, wherein, the apparatus further comprises a metallic ferrule, disposed within the bore in the rubber seal, and having surfaces thereof configured for biting into the outer surface of the gas supply line and the rubber seal, as the swivel-nut is tightened on the nipple, to thereby clamp the above-ground end of the gas supply line onto the hose bib of the nipple.

8. A gas riser apparatus, comprising:

a swivel-nut, a nipple fitting, a swage/crimp collar, a flexible conduit section, a rubber seal having a bore therein and a metallic ferrule;

the nipple fitting having one end thereof threaded for operative connection to a meter and an opposite end forming a hose bib connection, over which an end of a gas supply line may be inserted;

the opposite end of the nipple fitting also having a threaded portion thereof, disposed about the hose bib and threadably engaging with the swivel-nut, to thereby secure the swivel-nut to the nipple fitting;

the swivel-nut having a hollow body defining a centerline of the nut and first and second ends of the swivel-nut;

the swivel-nut further including an annular collar extending axially from the first end of the body about the centerline, and having an outwardly opening groove therein;

the second end of the swivel-nut having a threaded portion thereof for receiving the mating threaded portion of the opposite end of the nipple fitting;

the swivel-nut further defining an internal cavity thereof for receiving the rubber seal for applying a compressive force to an outer surface of the gas supply line as the swivel-nut is tightened into the opposite end of the nipple fitting;

the swage/crimp collar having an annular end portion thereof, including a radially inward projecting annular ring adapted for receipt within the outwardly opening groove in the annular collar of the swivel-nut, when the annular end portion of the swage/crimp collar is swaged/crimped onto the swivel-nut by radially inward directed pressure applied to an outer surface of the collar opposite the annular ring at a magnitude sufficient to permanently deform and interlock the radially inward projecting annular ring of the swage/crimp collar into the outwardly opening groove in the annular collar of the swivel-nut in such a manner that the swivel-nut can rotate freely with respect to the swage/crimp collar about the centerline of the swivel-nut but the swage/crimp collar and swivel-nut cannot be separated from one another;

the swage/crimp collar also having a counterbore in an end of the swage/crimp collar opposite the annular end portion;

the flexible conduit section being inserted into the counterbore in the end of the collar opposite the annular end portion of the swage/crimp collar and joined to the swage/crimp collar through a swaged/crimped joint formed by radially inward directed pressure applied to an outer surface of the collar opposite the flexible conduit section in the-counterbore at a magnitude sufficient to permanently deform and lock the swage/crimp collar onto the flexible conduit section;

the metallic ferrule being disposed within the bore in the rubber seal and having surfaces thereof configured for biting into the outer surface of the gas supply line and the rubber seal, as the swivel-nut is tightened on the nipple, to thereby clamp the above-ground end of the gas supply line onto the hose bib of the nipple;

the metallic ferrule having a substantially annular outward extending flange thereupon; and the bore in the rubber seal having a substantially annular inwardly opening groove therein for receipt of the flange of the metallic ferrule.

9. A gas riser apparatus for operatively connecting an end of a gas supply line to a meter, the gas riser comprising:

a swivel nut, a nipple fitting, a rubber seal, a swage/crimp collar, and a flexible conduit section having a meter end thereof;

(1) the swivel-nut having a hollow body defining a centerline of the nut and first and second ends of the swivel-nut;

the swivel-nut further including an annular collar extending axially from the first end of the body about the centerline, and having an outwardly opening groove therein;

the second end of the swivel-nut having a threaded portion thereof for receiving a mating threaded portion of the nipple fitting;

the swivel-nut further defining an internal cavity thereof, adapted for receiving the rubber seal for applying a compressive force to an outer surface of the gas supply line as the swivel-nut is tightened onto an end of the nipple fitting;

(2) the nipple fitting having one end thereof threaded for connection to the meter and an opposite end forming a hose bib connection, over which the end of a gas supply line may be inserted;

the opposite end of the nipple fitting having a threaded portion thereof, disposed about the hose bib and threadably engaging with the swivel-nut, to thereby secure the swivel-nut to the nipple fitting;

(3) the rubber seal having a bore therein for passage therethrough of the end of the gas supply line and adapted for installation within the internal cavity of the swivel-nut;

(4) the swage/crimp collar having an annular end portion thereof, including a radially inward projecting annular ring swaged/crimped into the outwardly opening groove in the annular collar of the swivel-nut by radially inward directed pressure applied to an outer surface of the collar opposite the annular ring in such a manner that the swivel-nut is freely rotatable about the swage/crimp collar without rotation of either the nipple fitting or the swage/crimp collar;

the swage/crimp collar further having an end thereof opposite the annular end portion and having a counterbore therein for receiving the meter end of the flexible conduit section;

(5) the meter end of the flexible conduit section being fixedly attached within the counterbore in the end of the swage/crimp collar so as to be non-rotatable with respect to the swage/crimp collar;

whereby, as a result of the above combination and configuration, when the one end of the nipple fitting is threadably secured against rotation to the meter, the swivel-nut is rotatable about the swage/crimp collar without rotation of either the swage/crimp collar or the flexible conduit section for compressing the rubber seal as the swivel-nut threadably advances on the nipple fitting.

10. The gas riser apparatus of claim 9, wherein the swage/crimp collar is elongated and forms a rigid conduit, and wherein the flexible conduit section is joined to the rigid conduit by a swaged/crimped joint.

11. The gas riser apparatus of claim 9, further comprising a plastic liner disposed within the flexible conduit.

12. The gas riser apparatus of claim 9, wherein:
the swage/crimp collar is an elongated rigid conduit having a first end thereof, and a second end thereof;
the second end of the rigid conduit including the radially inward projecting annular ring for receipt within the outwardly opening groove in the annular collar of the swivel-nut when the second end of the rigid conduit is swaged/crimped onto the swivel-nut by radially inward directed pressure applied to an outer surface of the rigid conduit opposite the annular ring; and
the first end of the rigid conduit having the counterbore therein for receiving the meter end of the flexible conduit section with the meter end of the flexible conduit section being fixedly attached within the counterbore in the end of the swage/crimp collar so that the flexible conduit is non-rotatable with respect to the rigid conduit.

13. The gas riser apparatus of claim 12, further comprising a plastic liner disposed within the flexible conduit.

14. The gas riser apparatus of claim 13, wherein the flexible conduit section is joined to the rigid conduit by a swaged/crimped joint.

15. The gas riser apparatus of claim 14, wherein the swaged/crimped joint is formed by applying radially inward directed pressure to the outer surface of the first end of the rigid conduit opposite the counterbore.

\* \* \* \* \*